G. R. WILLIAMS.

BEARING FOR SIGNALS FOR AUTOMOBILES.

APPLICATION FILED JUNE 12, 1913.

1,223,917. Patented Apr. 24, 1917.

WITNESSES

Robert N. Van Deusen

Virginia C. Spratt.

INVENTOR

George R. Williams

BY

Ralzemond A. Parker

ATTORNEY

THE NORRIS PETERS CO., PHOTO-LITHO., WASHINGTON, D. C.

UNITED STATES PATENT OFFICE.

GEORGE R. WILLIAMS, OF HIGHLAND PARK, MICHIGAN.

BEARING FOR SIGNALS FOR AUTOMOBILES.

1,223,917. Specification of Letters Patent. Patented Apr. 24, 1917.

Application filed June 12, 1913. Serial No. 773,165.

*To all whom it may concern:*

Be it known that I, GEORGE R. WILLIAMS, a citizen of the United States, residing at Highland Park, county of Wayne, State of Michigan, have invented a certain new and useful Improvement in Bearings for Signals for Automobiles, and declare the following to be a full, clear, and exact description of the same, such as will enable others skilled in the art to which it pertains to make and use the same, reference being had to the accompanying drawings, which form a part of this specification.

My invention relates to signals for automobiles and an object of my improvements is to provide a signaling apparatus that is cheap to construct, easy to assemble, and which may be readily and certainly operated.

I secure this object in the device illustrated in the accompanying drawing in which, Figure 1, is a plan view of an apparatus embodying my invention with so much of an automobile as is necessary to illustrate its connection therewith.

*a* indicates the chassis of an automobile. *b* the rear wheel. *c* indicates a clutch lever. *d* is a connecting rod extending rearwardly from one arm of the clutch lever *c*. *e* is a turn buckle by which the length of the connecting rod may be regulated.

*f* is a bar adapted to be secured at the rear and side of the chassis *a*. *g*, is a cylindrical rod secured in a vertical position by a screw shank *s* engaging in an aperture in the outer end of the rod *f*.

*m* is a sleeve fitting over the rod *g* and reamed out to form conical bearings at its ends. *q*, is an annulus having a coned outer surface corresponding to the cone bearing *n*. The annulus *q* slips over the rod *g* and is provided in its inner wall with a groove which slides over the key *r*, this construction permitting a longitudinal movement of the annulus *q* relative to the rod *g* but prevents a rotation thereof. The upper end of the annulus *q* is turned out to form a shoulder for a purpose hereinafter specified. *z*, is a lock washer resting against the upper surface of the rod *f* and surrounding the rod *g*. *p*, is an annulus similar to the annulus *q* having a conical surface with its smaller diameter upward. The annulus *p* rests against the lock washer *z*. The annulus *p* is connected to the rod *g* as above described with reference to the annulus *q*. The sleeve *m* rests with its lower conical bearing *o* upon the conical surface of the annulus *p*. The annulus *q* is then slipped over the upper end of the rod *g*, its conical surface coming against the coned bearing *n* at the upper end of the sleeve *m*.

Figures 3, 4, 5:
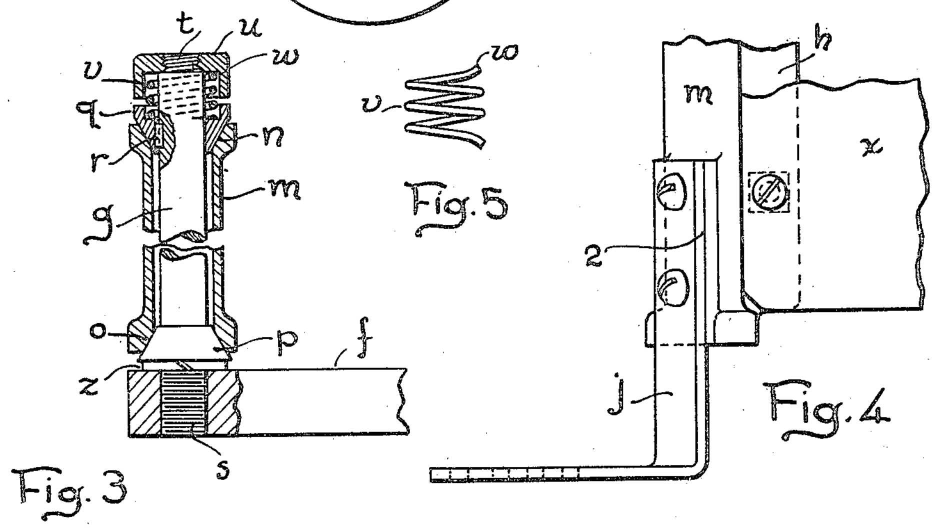
Fig. 3, is a detail view mostly in section showing the construction of the apparatus embodying my invention.
Fig. 4, is a detail elevation of part of such apparatus.
Fig. 5, is an elevation of the spring employed.

*v* is a helical spring surrounding the upper end of the rod *g* and resting at its lower end on the shoulder on the annulus *q*. *t* is a screw threaded shank at the upper end of the rod *g*. *u* is a nut having a concavity opening downward. The nut *u* screws upon the shank *t*. The upper end of the spring *v* comes within the concavity of the nut *u* and rests against the upper bounding wall of said concavity. By this arrangement the annulus *q* is always pressed downward by the spring *v* and held firmly to its place while the rotation of said sleeve is left free. The upper end of the wire constituting the spring *v* is turned upward, as shown at *w* Fig. 5, and engages against the nut *u* to hold the nut in place.

*h* is a flange extending longitudinally of the sleeve *m* and radially outward therefrom. *x* is a plate bearing the signal which it is desired to exhibit upon its surface. The sleeve *m* is cast with the surface 2 which may be machined off to receive the arm *j*.

The connecting rod *d* is pivoted at its rear end to the outer end of the arm *j*.

Figure 1:
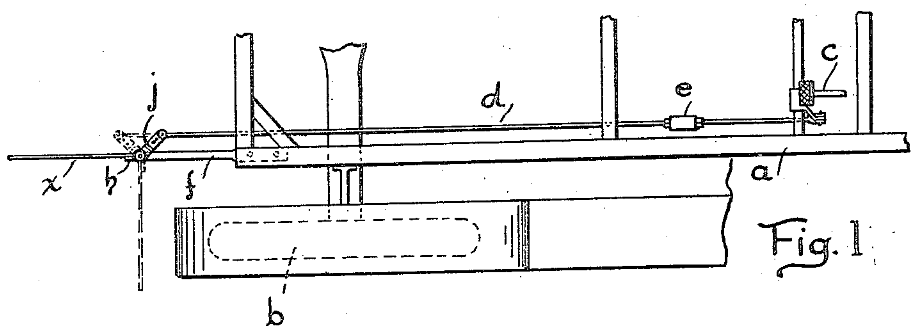
Figure 2:
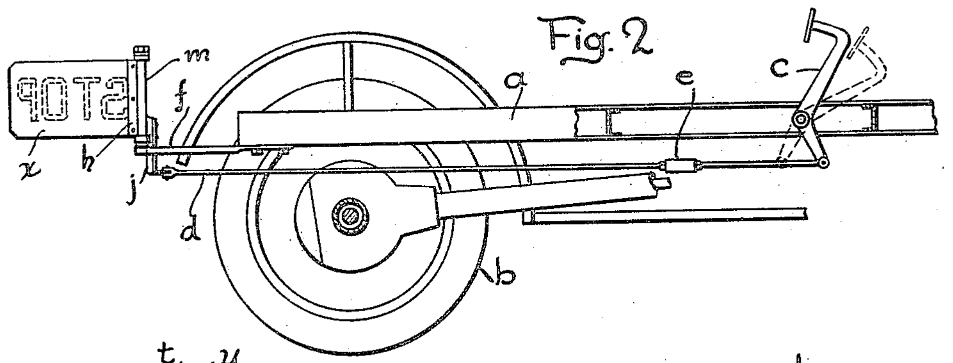
Fig. 2, is a side elevation of the same.

The operation of the above described device is as follows:

When the automobile is stopped the clutch is thrown out of engagement by actuating the lever *c*, this acts through the connecting rod *d* to turn the sleeve *m*, thus turning the plate *x* to the position marked in dotted lines in Fig. 1 where the word "Stop" will be exhibited toward the rear of the vehicle as a signal to a following vehicle.

By the construction above described the parts are readily assembled, are cheap to make, and are not liable to catch or get out of order, or become loose.

It will be seen that the above construction may be readily adapted to ball bearings as required.

What I claim is:

The combination with an automobile having a chassis, a cylindrical rod *g* extending vertically from said chassis, a sleeve *m* having its ends formed into hollow conical bearings, conical annuli adapted to slide over said rod and engage in said bearings, a nut upon the upper end of said rod, said nut having a concavity on its lower side, and a spring interposed between said nut and the upper annulus and passing within said concavity, said upper annulus being adapted to be pressed against its bearings in said sleeve by said spring.

In testimony whereof, I sign this specification in the presence of two witnesses.

GEORGE R. WILLIAMS.

Witnesses:
GRACE H. STODDARD,
ELLIOTT J. STODDARD.

Copies of this patent may be obtained for five cents each, by addressing the "Commissioner of Patents, Washington, D. C."